United States Patent
Fu

(10) Patent No.: US 9,225,514 B2
(45) Date of Patent: Dec. 29, 2015

(54) METHOD FOR IMAGE ENCRYPTION AND DECRYPTION INCORPORATING PHYSIOLOGICAL FEATURES AND IMAGE CAPTURE DEVICE THEREOF

(71) Applicant: ALTEK CORPORATION, Hsinchu (TW)

(72) Inventor: Yen-Sheng Fu, Taoyuan County (TW)

(73) Assignee: ALTEK CORPORATION, Hsinchu (TW)

( * ) Notice: Subject to any disclaimer, the term of this patent is extended or adjusted under 35 U.S.C. 154(b) by 0 days.

(21) Appl. No.: 14/303,736

(22) Filed: Jun. 13, 2014

(65) Prior Publication Data
US 2015/0312034 A1  Oct. 29, 2015

(30) Foreign Application Priority Data
Apr. 29, 2014 (TW) .............................. 103115241 A

(51) Int. Cl.
*G06F 21/00* (2013.01)
*H04L 9/08* (2006.01)
*H04L 9/14* (2006.01)

(52) U.S. Cl.
CPC ............ *H04L 9/0816* (2013.01); *H04L 9/0866* (2013.01); *H04L 9/14* (2013.01); *H04L 2209/24* (2013.01)

(58) Field of Classification Search
CPC ....... G06F 21/32; G06F 21/60; G06F 21/602; H04L 9/0861; H04L 9/0863; H04L 9/0866
See application file for complete search history.

(56) References Cited

U.S. PATENT DOCUMENTS

| | | | |
|---|---|---|---|
| 6,433,818 B1* | 8/2002 | Steinberg et al. | 348/161 |
| 2008/0219515 A1* | 9/2008 | Namgoong | 382/117 |
| 2010/0052852 A1* | 3/2010 | Mohanty | 340/5.83 |

* cited by examiner

*Primary Examiner* — Edward Zee
(74) *Attorney, Agent, or Firm* — Bacon & Thomas, PLLC

(57) ABSTRACT

The disclosure illustrates an image encryption and decryption method using physiological features and image capture device using the same method. The image encryption and decryption method comprises an encryption procedure and a decryption procedure. The encryption procedure comprises following steps. At first, an image capture module is used to capture a plurality of first iris images. An encryption-decryption module is used to generate a first key according to the plurality of first iris images. When an image is generated by the image capture module, the encryption-decryption module encrypts the image with the first key to generate an encrypted image. The decryption procedure comprises following a step of using the encryption-decryption module to decrypt the encrypted image with the first key.

8 Claims, 4 Drawing Sheets

METHOD FOR IMAGE ENCRYPTION AND DECRYPTION INCORPORATING PHYSIOLOGICAL FEATURES AND IMAGE CAPTURE DEVICE THEREOF

CROSS-REFERENCE TO RELATED APPLICATION

This application claims the benefit of Taiwan Patent Application No. 103115241, filed on Apr. 29, 2014, in the Taiwan Intellectual Property Office, the disclosure of which is incorporated herein in its entirety by reference.

BACKGROUND OF THE INVENTION

1. Field of the Invention

The present disclosure relates to a method for image encryption and decryption, in particular, to a method for image encryption and decryption incorporating physiological features, and the image capture device using the same method.

2. Description of the Related Art

At present, a consumer camera is usually installed with a lens having more than ten million pixels, and even a high end cell phone is also installed with the lens having twenty million pixels. Because of great shooting function and portability of current consumer camera and cell phone, people start to use such camera or cell phone to record various messages in life and work. At this situation, the possibility of storing high privacy data in the camera or cell phone becomes higher.

Therefore, the problem of privacy being damaged by leakage of the images stored in the camera or the cell phone becomes more serious. If the camera or the cell phone is lost, the owner often worries about the risk of leaking the private image stored in the camera or the cell phone, or worries that the person with high aspirations and determination may take the camera or the cell phone away temporarily for stealing the images.

Although the user can set password to protect the image stored in the camera or the cell phone, it is hard to prevent someone from stealing the password for accessing the image stored the camera or the cell phone. Another approach is to use the application to encrypt the image. However, if the cell phone or the camera is taken by the person who is familiar with the operation of the application, the privacy data may leak.

Therefore, what is need is a method capable of encrypting the image stored in the camera with high security.

SUMMARY OF THE INVENTION

An aspect of exemplary embodiments of the present disclosure directs to a method for image encryption and decryption incorporating physiological features and an image capture device using the same method capable of using irises of a plurality of users as a key to encrypt or decrypt the images stored in the camera, so as to improve the privacy of the images efficiently.

An aspect of exemplary embodiments of the present disclosure directs to a method for image encryption and decryption method incorporating physiological features and an image capture device using the same method capable of providing a valid time period of the key to control the encryption-decryption function and image capture function of the camera, so as to prevent the camera being stolen and the images stored in the stolen camera from being used illegally.

An exemplary embodiment of the present disclosure is to provide a method for image encryption and decryption method incorporating physiological features. The method is adapted for an image capture device which comprises an image capture module, an encryption-decryption module and a processing module. The method executes an encryption procedure and a decryption procedure. The encryption procedure comprises following steps of: using the image capture module to capture a plurality of first iris images; using the encryption-decryption module to generate a first key according to the plurality of first iris images; using the encryption-decryption module to encrypt an image generated by the image capture module with the first key to generate an encrypted image. The decryption procedure comprises following a step of using the encryption-decryption module to decrypt the encrypted image.

Preferably, the first key has a first valid time period, and the processing module permits the image capture module to generate the image during the first valid time period after the first key is generated.

Preferably, the encryption-decryption module generate a second key based on a plurality of second iris images, and the processing module controls the encryption-decryption module to decrypt the encrypted image with the second key when the second key matches the first key.

Preferably, the second key has a second valid time period, and the processing module permits the encryption-decryption module to decrypt the encrypted image with the second key during the second valid time period after the second key is generated.

Preferably, the image capture device further comprises a display module, and the method further comprises a step of using the display module to display a prompting message related to a capturing sequence of a plurality of first iris image.

An exemplary embodiment of the present disclosure is to provide an image capture device which utilizes physiological features in image encryption and decryption. The image capture device comprises an image capture module, an encryption-decryption module and a processing module. The image capture module captures a plurality of first iris images or an image. The encryption-decryption module generates the first key based on a plurality of first iris images, and encrypts the image with the first key to generate an encrypted image, or decrypts the encrypted image with the first key. The process module controls the encryption-decryption module to generate the encrypted image with the first key, or controls the encryption-decryption module to decrypt the encrypted image.

Preferably, the first key has a first valid time period, and the processing module permits the image capture module to generate the image during the first valid time period after the first key is generated.

Preferably, the encryption-decryption module generate a second key based on a plurality of second iris images, and the processing module controls the encryption-decryption module to decrypt the encrypted image with the second key when the second key matches the first key.

Preferably, the second key has a second valid time period, and the processing module permits the encryption-decryption module to decrypt the encrypted image with the second key during the second valid time period after the second key is generated.

Preferably, the image capture device of the present disclosure further comprises a display module to display a prompting message related to a capturing sequence of the plurality of first iris images.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1:
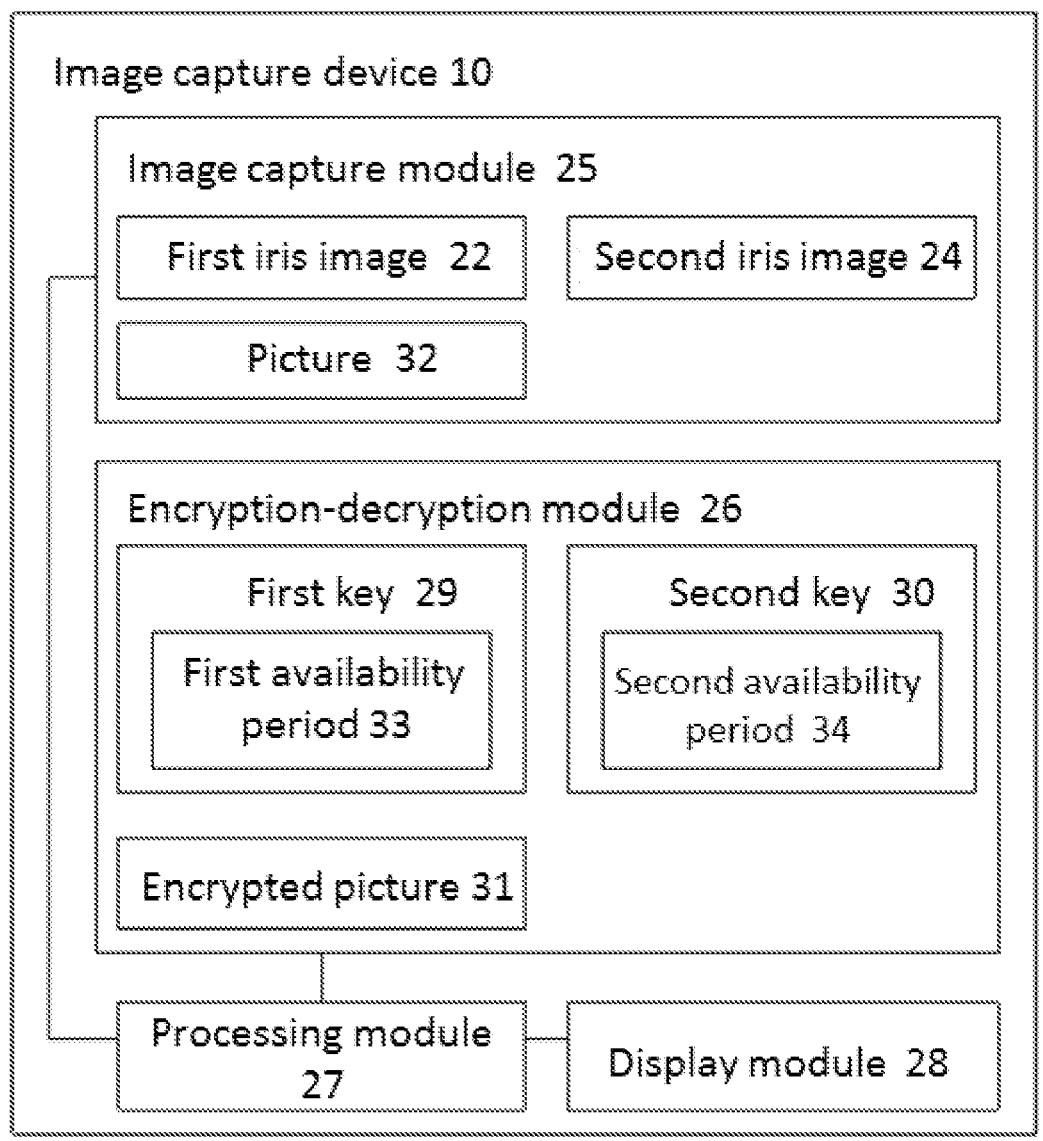
FIG. 1 is a block diagram of an exemplary embodiment of an image capture device utilizing physiological features in image encryption and decryption according to the present disclosure.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Please refer to FIG. 1 which is a block diagram of an exemplary embodiment of an image capture device utilizing physiological features in image encryption and decryption according to the present disclosure. The image capture device 10, which uses physiological features for image encryption and decryption, comprises an image capture module 25, an encryption-decryption module 26, and a processing module 27. In implementation, the image capture module 25 comprises a lens operative to capture a plurality of first iris images 22 of the first users (not shown in FIG. 1), a plurality of second iris images 24 of the second users (not shown in FIG. 1), or shoot the environment to generate an image 32. In implementation, the image capture device 10, which utilizes physiological features in image encryption and decryption, is a camera or a smart phone.

The encryption-decryption module 26 can be implemented by an application software which generates a first key 29 based on the plurality of first iris images 22 and encrypts the image 32 with the first key 29 to generate an encrypted image 31, and at different time, generates a second key 30 based on a plurality of second iris images 24 to decrypt the encrypted image 31. Preferably, the first key 29 and the second key 30 have a first valid time period 33 and a second valid time period 34, respectively. In addition, the encryption-decryption module 26 can firstly normalize the plurality of first iris images 22 or the plurality of second iris images 24 by using variance or cumulative histogram, in order to generate the first key 29 or the second key 30.

The processing module 27 comprises a processor. The processing module 27 is operative to permit the image capture module 25 to generate the image 32, to control the encryption-decryption module 26 to encrypt the image 32 with the first key 29 to generate the encrypted image 31, and to control the encryption-decryption module 26 to decrypt the encrypted image 31 with the second key 30. When the period of time after the first key 29 is generated does not exceed the first valid time period 33, the processing module 27 permits the image capture module 25 to generate the image 32 and control the encryption-decryption module 26 to generate the encrypted image 31. When it is desired to decrypt the encrypted image 31, if the period of time after the first key 29 is generated does not exceed the first valid time period 33, the processing module 27 can set the first key 29 as the second key 30 and control the encryption-decryption module 26 to decrypt the encrypted image 31 with the second key 30. Alternatively, when the period of time after the first key 29 is generated exceeds the first valid time period 33, the processing module 27 controls the encryption-decryption module 26 to decrypt the encrypted image 31 with the second key 30. The decryption condition is that when the second key 30 matches the first key 29 and the period of time after the second key 30 is generated does not exceed the second valid time period 34, the processing module 27 can control the encryption-decryption module 26 to decrypt the encrypted image 31.

For example, the user can set the first valid time period 33 for the first key 29 as three hours, it indicates that the user can use the image capture device 10 to shoot the image 32 and further encrypt the image 32 within three hours, but the user cannot operate the image shooting function and the encryption function of the image capture device 10 when exceeding three hours. On the other hand, the user can use the encryption-decryption module 26 and the first key 29 to decrypt the encrypted image 31 within three hours, to review the image 32. Therefore, even if the image capture device 10 is lost, it fails to operate the image shooting function of the image capture device 10 when exceeding the first valid time period 33 for the first key 29, and the problem of undesired leakage of the image 32 stored in the image capture device 10 does not occur to bother the user. When the period of time after the first key 29 is generated exceeds the first valid time period 33, the user can capture the iris image of the user again to generate the second key 30 for decrypting the encrypted image 31, so that the user can review the image 32.

Further illustration, the camera 100 of the present disclosure, which uses physiological features for image encryption-decryption, can further comprise a display module 28 such as a screen. The display module 28 has an interface to display a prompting message related to a capturing sequence of the plurality of first iris images 22 or the plurality of second iris images 24, to prompting the user how to collect the iris images in sequence.

Figure 2:
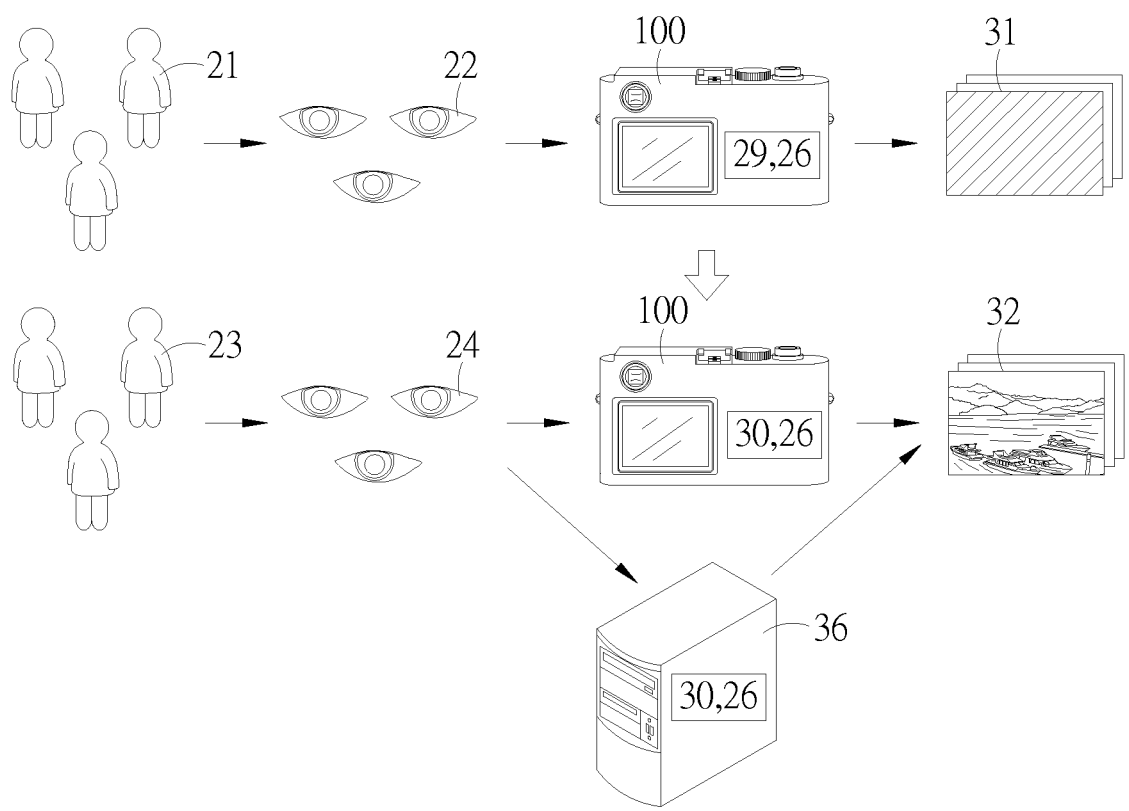
FIG. 2 is a schematic view of the exemplary embodiment of the image capture device utilizing physiological features in image encryption and decryption according to the present disclosure.

Please refer to FIG. 2 which is a schematic view of an exemplary embodiment of an image capture device utilizing physiological features in image encryption and decryption according to the present disclosure. In this exemplary embodiment, the camera 100 is taken as an example of the image capture device for encryption and decryption, but the present disclosure is not limited thereto. Before the camera 100 is used to shoot the image, a plurality of first iris images 22 should be captured firstly, and the encryption-decryption module 26 of the camera 100 generates a first key 29 based on the plurality of first iris images 22, so the images captured by the camera 100 are all encrypted images 31 which are encrypted with the first key 29.

When the user desires to review the encrypted images 31 generated by the camera 100, if the encryption-decryption module 26 has a second key 30 and the second key 30 matches the first key 29, the user can use the encryption-decryption module 26 to decrypt the encrypted images 31 with the second key 30. However, if there is no second key 30 or the valid time period of the second key 30 is expired, a plurality of second iris images 24 of the second users are captured. The iris of each person has uniqueness, so the first users 21 and the second users 23 must be the same, and the second key 30 generated based on the second iris images 24 also matches the first key 29, the encryption-decryption module 26 can decrypt the encrypted images 31 with the second key 30.

Further illustration, the encryption-decryption module 26 can be a software application or a cell phone application capable of being executed in a computer 36 or a smart phone. When the user stores the encrypted images 31 in the computer 36, the user can use the encryption-decryption module 26 to decrypt the encrypted images 31 while the second key 30 exists in the computer 36.

Figure 3:
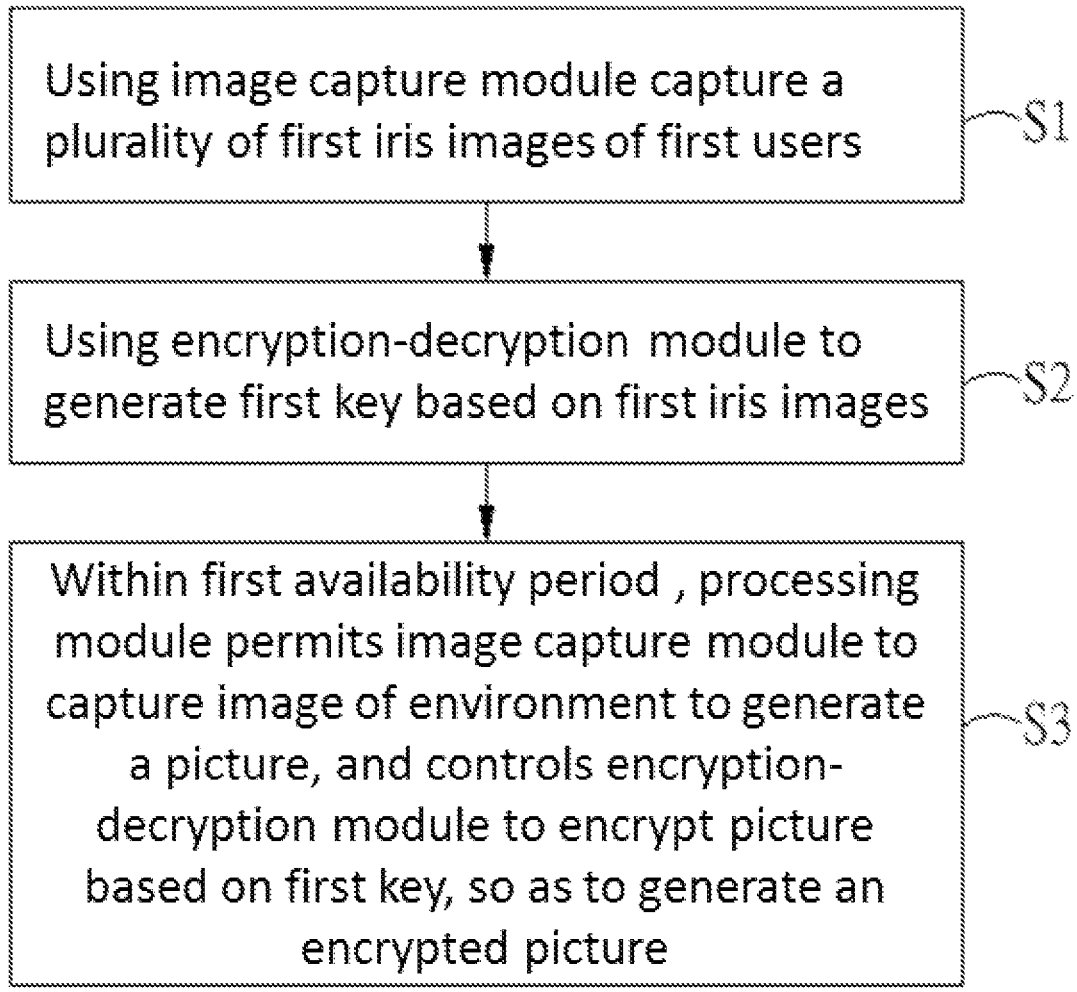
FIG. 3 is a flow diagram of an encryption procedure of a second embodiment of a method for image encryption and decryption method incorporating physiological features according to the present disclosure.

Please refer to FIG. 3 which is a flow diagram of an encryption procedure of a second embodiment of a method for image encryption and decryption method incorporating physiological features according to the present disclosure. The method is adapted for a camera and the encryption procedure comprises three steps.

In step S1, the image capture module is used to capture a plurality of first iris images of the first users. In step S2, the encryption-decryption module is used to generate a first key based on a plurality of first iris images, and the first key has a first valid time period. In step S3, when the period of time after the first key is generated does not exceed the first valid time period, the processing module permits the image capture module to shoot the environment to generate an image, and controls the encryption-decryption module to encrypt the image with the first key, so as to generate an encrypted image. The execution of the method is similar as the FIG. 2, the camera 100 is used to capture the iris image of the first users 21, and a first key 29 is generated correspondingly and used to generate the encrypted image 31.

Figure 4:
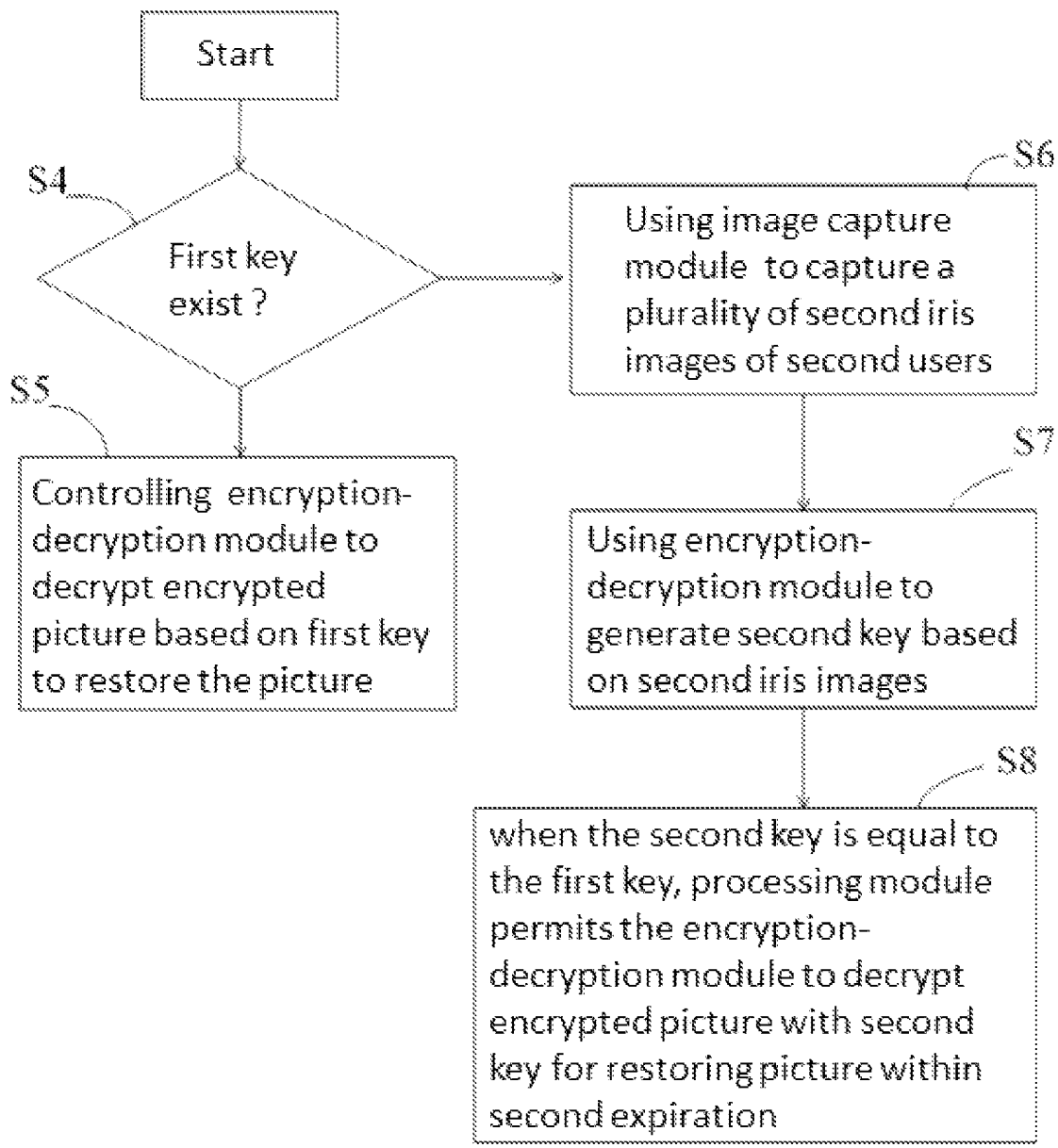
FIG. 4 is a flow diagram of a decryption procedure of a third embodiment of the method for image encryption and decryption method incorporating physiological features according to the present disclosure.

Please refer to FIG. 4 which is a flow diagram of a decryption procedure of a third embodiment of a method for image encryption and decryption method incorporating physiological features according to the present disclosure. The decryption procedure comprises five steps. In step S4, it is judged whether the first key exists. If the first key exists, the step S5 is executed. If the first key does not exist, the step S6 to step S8 are executed. In step S5, the encryption-decryption module is controlled to decrypt the encrypted image with the first key. In step S6, the image capture module is used to capture a plurality of second iris images of second users. In step S7, the encryption-decryption module is used to generate a second key based on a plurality of second iris images, and the second key has a second valid time period. In step S8, when the second key matches the first key, and the second valid time period after the second key is generated does not exceed the second valid time period, the processing module permits the encryption-decryption module to decrypt the encrypted image with the second key. The step S6 to S8 are executed like the FIG. 2, the camera 100 is used to capture the plurality of second iris image 24, and the second key 30 is generated correspondingly and the second key 30 is used to generate the encrypted image 31.

To sum up, according to the method for image encryption and decryption method incorporating physiological features, and the image capture device using the same method of the present disclosure, a plurality of irises of users can be used as a key to encrypt or decrypt the images stored in the camera, so as to improve the privacy security for images efficiently. In addition, the key of the present disclosure is set with a valid time period to control the image capture function and image encryption-decryption function of the camera, so as to prevent the camera being stolen and the images stored in the stolen camera from being used.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A method for image encryption and decryption which incorporates physiological features, adapted for an image capture device comprising an image capture module, an encryption-decryption module and a processing module, and the method comprising:
    executing an encryption procedure which comprises steps of:
    using the image capture module to capture a plurality of first iris images, respectively;
    using the encryption-decryption module to generate a first key based on the plurality of first iris images; and
    controlling the encryption-decryption module to encrypt an image generated by the image capture module with the first key to generate an encrypted image; and
    executing a decryption procedure which comprises a step of:
    controlling the encryption-decryption module to decrypt the encrypted image;
    wherein the first key has a first valid time period, and the processing module permits the image capture module to generate images within the first valid time period.

2. The method according to claim 1, wherein the encryption-decryption module generates a second key based on a plurality of second iris images, and the processing module controls the encryption-decryption module to decrypt the encrypted image with the second key when the second key matches the first key.

3. The method according to claim 2, wherein the second key has a second valid time period, the processing module permits the encryption-decryption module to decrypt the encrypted image with the second key within the second valid time period.

4. The method according to claim 1, wherein the image capture device further comprises a display module, and the image encryption and decryption method further comprises a step of:

using the display module to display a prompting message related to a capturing sequence of the plurality of first iris images.

5. An image capture device which utilizes physiological features in image encryption and decryption, comprising:

an image capture module, configured for capturing a plurality of first iris images or an image;

an encryption-decryption module, configured for generating a first key based on the plurality of first iris images, and encrypting the image with the first key to generate an encrypted image, or decrypting the encrypted image with the first key; and a processing module, configured for controlling the encryption-decryption module to generate the encrypted image with the first key, or controlling the encryption-decryption module to decrypt the encrypted image with the first key;

wherein the first key has a first valid time period, and the processing module permits the image capture module to generate the image within the first valid time period.

6. The image capture device according to claim 5, wherein the encryption-decryption module generates a second key based on a plurality of second iris images, and the processing module controls the encryption-decryption module to decrypt the encrypted image with the second key when the second key matches the first key.

7. The image capture device according to claim 6, wherein the second key has a second valid time period, the processing module permits the encryption-decryption module to decrypt the encrypted image with the second key within the second valid time period.

8. The image capture device according to claim 5, further comprising a display module configured for displaying a prompting message related to a capturing sequence of the plurality of the first iris images.

* * * * *